Patented Apr. 1, 1952

2,590,971

UNITED STATES PATENT OFFICE 2,590,971

HYDROGENATED VINYLCYCLOHEXENE-DIMER

Herbert L. Johnson, Media, Pa., and Frances J. Bondhus, Oskaloosa, Iowa, assignors to Sun Oil Company, Philadelphia, Pa., a corporation of New Jersey No Drawing. Application November 24, 1945, Serial No. 630,694

3 Claims. (Cl. 260—666)

This invention relates to a new hydrocarbon compound and to its method of preparation. More particularly, the invention relates to the preparation of a hydrogenated vinylcyclohexene dimer having desirable properties as will appear hereinafter.

In co-pending application Serial No. 629,194, filed November 16, 1945, by the instant inventors, now Patent No. 2,543,092, vinylcyclohexene dimer is described and claimed. In that application vinylcyclohexene dimer is prepared by treating vinylcyclohexene with sulfuric acid of certain concentrations and at specified temperatures. The preferred temperature range given in that case is 120° C.–130° C. and the preferred sulfuric acid concentration is within the range 35%–65%. Phosphoric and/or hydrofluoric acid can be employed in lieu of sulfuric acid. The dimer obtained according to that application is a pale yellow liquid having a boiling point of 118° C.–119° C. at 5 millimeters mercury, a refractive index of 1.5274 $n_D^{25°\,C.}$ and a pungent odor resembling that of pine oil.

The hydrogenated vinylcyclohexene dimer of the present invention is prepared by the hydrogenation of vinylcyclohexene dimer employing hydrogen and a catalyst as set out more fully in the following example:

Example

Fifty grams of vinylcyclohexene dimer and 175 millimeters of absolute ethyl alcohol together with 5 grams of Raney nickel are placed into a bomb maintained at about 2,000 lbs. pressure and at a temperature within the range of 100° C.–175° C. while hydrogen is added until no further hydrogenation appears to occur.

The product is a colorless oil, having a boiling point of 121° C.–122° C. at 8 millimeters mercury, a refractive index of 1.5112 $n_D^{25°\,C.}$, and is extremely stable to temperature. The product analyzes correctly for $C_{16}H_{26}$.

Vinylcyclohexene dimer having the empirical formula $C_{16}H_{24}$ it would be expected that the fully hydrogenated or saturated dimer would analyze $C_{16}H_{30}$. Thus, the compound obtained is not that which was expected.

The product obtained according to the invention appears to have use as a plasticizer, spraying oil, or base therefore, etc.

We claim:
1. Hydrogenated vinylcyclohexene dimer having the empirical formula $C_{16}H_{26}$.
2. The hydrogenated dimer of vinylcyclohexene which is a colorless oil having a boiling point of 121° C.–122° C. at 8 millimeters mercury, a refractive index of 1.5112 $n_D^{25°\,C.}$ and having the empirical formula $C_{16}H_{26}$.
3. Process for preparing a hydrogenated dimer of vinylcyclohexene which comprises subjecting a dimer of vinylcyclohexene which is a pale yellow liquid having a boiling point of 118° C.–119° C. at 5 mm. mercury pressure, a refractive index $n_D^{25}=1.5274$, and which has a pungent odor resembling that of pine oil, to the action of hydrogen in the presence of Raney nickel, at a pressure of about 2,000 lbs. sq. in. and a temperature of from 100° C. to 175° C., maintaining said conditions until hydrogenation ceases, and separating from the reaction mixture a hydrogenated vinylcyclohexene dimer which is a colorless oil having the empirical formula $C_{16}H_{26}$, a boiling point of 121° C. to 122° C. at 8 mm. mercury pressure, and a refractive index $n_D^{25}=1.5112$.

HERBERT L. JOHNSON.
FRANCES J. BONDHUS.

REFERENCES CITED

The following references are of record in the file of this patent:

UNITED STATES PATENTS

| Number | Name | Date |
|---|---|---|
| 1,885,060 | Hofmann et al. | Oct. 25, 1932 |
| 1,910,691 | Gubelman et al. | May 23, 1933 |
| 2,182,617 | Michel | Dec. 5, 1939 |
| 2,249,112 | Carmody | July 15, 1941 |
| 2,401,414 | Doumani et al. | June 4, 1946 |

FOREIGN PATENTS

| Number | Country | Date |
|---|---|---|
| 343,116 | Great Britain | Feb. 16, 1931 |

OTHER REFERENCES

Yur'ev et al., C. A. 31, page 2173.
Carter, J. Soc. Chem. Ind., 44, 543T–546T (1925).